(12) United States Patent
Braad et al.

(10) Patent No.: US 7,976,920 B2
(45) Date of Patent: Jul. 12, 2011

(54) FLEXIBLE UNBONDED PIPE AND A METHOD FOR PRODUCING SUCH PIPE

(75) Inventors: Poul Erik Braad, Birkerød (DK); Inger Margrete Procida, Hellerup (DK)

(73) Assignee: NKT Flexibles I/S, Brondby (DK)

( * ) Notice: Subject to any disclaimer, the term of this patent is extended or adjusted under 35 U.S.C. 154(b) by 934 days.

(21) Appl. No.: 10/572,190

(22) PCT Filed: Sep. 20, 2004

(86) PCT No.: PCT/DK2004/000637
§ 371 (c)(1),
(2), (4) Date: May 31, 2006

(87) PCT Pub. No.: WO2005/028198
PCT Pub. Date: Mar. 31, 2005

(65) Prior Publication Data
US 2007/0036925 A1    Feb. 15, 2007

(30) Foreign Application Priority Data
Sep. 19, 2003 (DK) .................................. 2003 01371

(51) Int. Cl.
*B32B 1/08* (2006.01)
*F16L 11/00* (2006.01)
*F16L 11/08* (2006.01)

(52) U.S. Cl. ............... 428/36.91; 138/133; 138/134; 138/138; 138/148; 138/172; 428/35.8; 428/36.9

(58) Field of Classification Search .............. 428/36.9, 428/36.91, 35.8; 138/133, 134, 138, 148, 138/172
See application file for complete search history.

(56) References Cited

U.S. PATENT DOCUMENTS

| | | | |
|---|---|---|---|
| 4,472,597 A | 9/1984 | Uematsu | 174/106 |
| 4,593,853 A | 6/1986 | Schad et al. | 237/56 |
| 4,614,208 A | 9/1986 | Skarelius | 138/140 |
| 5,601,893 A | 2/1997 | Strassel et al. | 428/35.9 |
| 6,006,788 A | 12/1999 | Jung et al. | 138/131 |
| 6,085,799 A | 7/2000 | Kodaissi et al. | 138/135 |
| 6,098,667 A | 8/2000 | Odru | |
| 6,106,761 A | 8/2000 | Sjoberg et al. | 264/492 |
| 6,110,550 A | 8/2000 | Jarrin et al. | 428/36.91 |
| 6,123,114 A | 9/2000 | Seguin et al. | 138/124 |

FOREIGN PATENT DOCUMENTS

| | | |
|---|---|---|
| EP | 0 937 933 B1 | 1/2003 |
| EP | 1 119 684 B1 | 5/2003 |
| EP | 1 321 702 A1 | 6/2003 |
| EP | 1 663 637 B1 | 8/2008 |
| GB | 1 449 753 A | 9/1976 |
| GB | 2 336 885 A | 11/1999 |
| GB | 2 385 399 A | 8/2003 |
| WO | WO 86/07432 | 12/1986 |
| WO | WO 99/49254 | 9/1999 |
| WO | WO 99/67560 A | 12/1999 |
| WO | WO 00/36324 | 6/2000 |
| WO | WO-01/51839 A1 * | 7/2001 |
| WO | WO 01/61232 A | 8/2001 |
| WO | WO 01/81809 A1 | 11/2001 |
| WO | WO 02/31394 A1 | 4/2002 |
| WO | WO 02/095281 A1 | 11/2002 |
| WO | WO 03/078134 A | 9/2003 |
| WO | WO 03078134 A1 * | 9/2003 |

* cited by examiner

*Primary Examiner* — Brent T O'Hern
(74) *Attorney, Agent, or Firm* — Pearne & Gordon LLP

(57) ABSTRACT

The present invention relates to a flexible unbonded pipe comprising an inner liner capable of forming a barrier against outflow of a fluid which is conveyed through the pipe, and one or more armouring layers on the outer side of the inner line. The flexible unbonded pipe comprises at least one polymer layer and one film layer, said polymer layer being bonded to said film layer. The film layer may preferably be a metal film layer, such as aluminum film, stainless steel film or duplex film. The polymer layer may preferably be cross-linked polyethylene. The interfacial bonding between the polymer layer and the film layer should preferably be sufficiently strong to prevent creation of gas pockets between the layers when subjected to an increased pressure of aggressive fluids (hydrogen, sulphides, methane and carbon dioxide) on the film side of the pipe. Thereby, it is possible to protect armour layer(s) from aggressive fluids.

36 Claims, No Drawings

FLEXIBLE UNBONDED PIPE AND A METHOD FOR PRODUCING SUCH PIPE

This application claims priority benefits based on Danish Patent Application No. PA 2003 01371, Filed Sep. 19, 2003, and is a National Phase Application of PCT/DK2004/000637PCT.

TECHNICAL FIELD

The present invention relates to a flexible unbonded pipe and a process for its preparation. The flexible unbonded pipe is particularly useful in aggressive environments, due to its ability to withstand the diffusion of gases from a fluid in the pipe.

BACKGROUND ART

Flexible unbonded pipes as such are well known in the art. Such pipes comprise an inner liner which forms a barrier against the outflow of the fluid which is conveyed through the pipe, and one or more armouring layers on the outer side of the inner liner (Outer armouring layer(s)). The flexible pipe may comprise additional layers such as one or more inner armour layers to prevent the collapse of the inner liner. Such inner armouring layer or layers are normally referred to as a carcass. An outer sheath may be provided with the object of forming a barrier against the ingress of fluids from the pipe surroundings to the armour layers.

Typical unbonded flexible pipes are e.g. disclosed in WO0161232A1, U.S. Pat. No. 6,123,114 and U.S. Pat. No. 6,085,799.

The term "unbonded" means in this text that at least two of the layers including the armouring layers and polymer layers are not bonded to each other. In practice the pipe will comprise at least two armouring layers, which are not bonded to each other directly or indirectly via other layers along the pipe. Thereby the pipe becomes bendable and sufficiently flexible to roll up for transportation.

The above-mentioned type of flexible pipes is used, among other things, for off shore as well as some on-shore applications for the transport of fluids and gases. Flexible pipes can e.g. be used for the transportation of fluids where very high or varying water pressure exists along the longitudinal axis of the pipe, such as riser pipes which extend from the seabed up to an installation on or near the surface of the sea, pipes for transportation of liquid and gases between installations, pipes which are located at great depths on the seabed, or between installations near the surface of the sea.

In traditional flexible pipes, the one or more outer armouring layers are most often in the form of helically wound steel wires e.g. shaped as profiles, where the individual layers may be wound at different winding angle relative to the pipe axis.

When using such prior art flexible pipes for transportation of aggressive gases, raw oils and similar fluids, it has been found that undesired and often corrosive gases and liquids are diffusing through the inner liner and into the outer armouring layers.

In prior art pipes, this problem has been solved in a number of different ways. In EP 1119684 a solution is disclosed where the lumen between an inner liner and an outer sheath can be flushed to remove undesired gases and liquids that has been diffusing through the inner liner into the lumen. This solution is however not suitable in all situations.

Another approach for preventing the aggressive and destructive corrosion of the armour wires is to provide armour wires of a non-corrosive material. Such solution has been disclosed in WO 02095281, wherein the armouring wires are made from a composite material. Such wires are however relatively expensive.

In WO0231394 it is suggested to allow environmental sea water to come into contact with the outer armour layers whereby gases and liquids that have been diffusing through the inner liner are flushed away from the armours. As the sea water may be corrosive in itself, this solution either requires that the armour wires are of a non-corrosive material or that the pipe is used in low corrosive outer environments.

U.S. Pat. No. 6,006,788 discloses a flexible pipe with an internal gas proof undulating metal tube. However, this pipe is relatively stiff as the internal gas proof undulating metal tube needs to have a certain thickness in order to be sufficiently stable. Furthermore, the internal gas proof metal tube need to be resistive to the medium to be transported in the pipe, which in practice means that pipes of this type have a very limited used.

SUMMARY OF INVENTION

The objective of the invention is to provide a flexible, unbonded pipe useful for transportation of gases and crude oils and other aggressive fluids, which pipe is improved compared with the respective prior art pipes. In particular, it is an objective to provide a flexible, unbonded pipe which does not have the drawbacks of the prior art pipes described above.

The invention also aims at providing a method for producing such flexible, unbonded pipes.

These objectives have been solved by the invention as it is defined in the claims and described in the following.

The flexible pipe according to the invention can thus be used for transporting corrosive gases, crude oils and other corrosive fluids, with less tendency for corrosion of the armouring wires than prior art solutions as disclosed above.

Simultaneously, the construction is very simple and easy to produce, and furthermore the corrosion stability properties obtained are not at the expense of flexibility properties of the flexible pipe.

According to the invention the flexible pipe according to the invention has an increased corrosion stability due to the fact that the diffusion of aggressive fluids into the armouring wires is reduced or even eliminated while the flexible pipe remains sufficiently flexible for being transported on reels.

DISCLOSURE OF INVENTION

The flexible pipe according to the invention thus comprises at least one polymer layer and one film layer, said polymer layer being bonded to said film layer.

Generally, it is desired that the film layer is thinner than said polymer layer, and that said film layer furthermore provides a higher diffusion barrier to the fluids in question, i.e. the gasses or liquids to be transported in the pipe.

The polymer layer may in principle be any kind of polymer layer.

In one embodiment, it is desired that the polymer layer is capable of resisting the high temperatures of the fluid conveyed e.g. in the order of 130° C. to 150° C., or even in the order of 130° C. to 180° C., and which is easy to work industrially, in particular by extrusion. The polymeric materials that have these properties include in particular certain semi-crystalline polymers. Furthermore, it is desired that the polymer layer should be resistant to live crude with little or no blistering or swelling.

Examples of useful polymers for the polymer layers include the following:
polyolefins, such as polyethylene and poly propylene;
polyamide, such as poly amide-imide, polyamide-11 (PA-11) and polyamide-12 (PA-12);
polyimide (PI);
polyurethanes;
polyureas;
polyesters;
polyacetals;
polyethers, such as polyether sulphone (PES);
polyoxides;
polysulfides, such as polyphenylene sulphide (PPS);
polysulphones, such as polyarylsulphone (PAS);
polyacrylates;
polyethylene terephthalate (PET);
polyether-ether-ketones (PEEK);
polyvinyls;
polyacrylonitrils;
polyetherketoneketone (PEKK); and co-polymers of the preceding;
fluorous polymers such as polyvinylidene diflouride (PVDF), homopolymers and copolymers of vinylidene fluoride ("VF2"), homopolymers and copolymers of trifluoroethylene ("VF3"), copolymers and terpolymers comprising two or more different members selected from the group consisting of VF2, VF3, chlorotrifluoroethylene, tetrafluoroethylene, hexafluoropropene, and hexafluoroethylene.

The flexible pipe of the invention may thus preferably comprise at least 50% by weight, such as at least 70% by weight, such as at least 85% by weight of one or more of the polymers selected from the group of polymers specified.

In one embodiment, the polymer layer comprises one or more of polyamide, poly(vinylidene fluoride) (PVDF).

In one embodiment, the polymer layer comprises at least 50% by weight, such as at least 85% by weight of cross-linked polyethylene (XLPE). In one embodiment, the polymer layer consisting essentially of cross-linked polyethylene (XLPE) and one or more inorganic fillers.

The polymer layer may preferably be as in the co-pending application PCT/DK 03/00191, which is cross-linked using IR radiation. The disclosure of PCT/DK 03/00191 is hereby incorporated by reference.

The film layer may in principle be a film of any type of material which, preferably in the desired thickness e.g. less than 2 mm or even less than 1 mm, is flexible.

Useful film layers include materials of the group consisting of polymer, metal, metal containing compositions and combinations thereof.

Useful polymer materials for the film include inter alia polymer film comprising one or more of the polymer material selected from the group consisting of
polyolefins, such as polyethylene and poly propylene;
polyamide, such as poly amide-imide, polyamide-11 (PA-11), polyamide-12 (PA-12) and polyamide-6 (PA-6);
polyimide (PI);
polyurethanes;
polyureas;
polyesters;
polyacetals;
polyethers, such as polyether sulphone (PES);
polyoxides;
polysulfides, such as polyphenylene sulphide (PPS);
polysulphones, such as polyarylsulphone (PAS);
polyacrylates;
polyethylene terephthalate (PET);
polyether-ether-ketones (PEEK);
polyvinyls;
polyacrylonitrils;
polyetherketoneketone (PEKK); and lymers of the preceding;
fluorous polymers such as polyvinylidene diflouride (PVDF), homopolymers and copolymers of vinylidene fluoride ("VF2"), homopolymers and copolymers of trifluoroethylene ("VF3"), copolymers and terpolymers comprising two or more different members selected from the group consisting of VF2, VF3, chlorotrifluoroethylene, tetrafluoroethylene, hexafluoropropene, and hexafluoroethylene.

In one embodiment, the film layer is made from metal e.g. in the form of a metal film such as a film comprising or consisting of aluminum, stainless steel and/or duplex.

In one embodiment, the film layer is a layered material. The layered film may e.g. be composed of a metal layer and a primer layer, wherein the primer preferably may be a layer comprising C atoms. This aspect will be described further below.

In one embodiment, the layered film comprises at least one metal layer, such as two, such as three metal layers. The film layer may optionally comprise one or more polymeric layers.

In one embodiment, the film layer may comprise metal containing compositions, such as metal oxides and metal halides. When using such material the film layer should preferably be a layered material so that the metal oxides and metal halides are protected from contact with corrosive fluids.

The film layer may in one embodiment be a mixture of polymer with carbon and/or metal and/or metal containing particles.

In order to minimize the risk of forming gas pockets in the interfacial area of the combined polymer layer and film layer, these layers are bonded to each other. The bonding may in principle be provided by any means provided it is sufficiently strong to avoid the creation of interfacial gas pockets.

In one embodiment, the polymer layer is bonded to the film layer via one or more bondings from the group of physical bondings and chemical bondings, such as ion bondings and covalent bondings.

In one embodiment, it is desired that the bonding between the polymer layer and the film layer is stronger than the internal bondings in one of the polymer layer and the film layer.

This property may be measured by a peel test for tearing the film and the polymer layer from each other. e.g. using ASTM D3330.

When performing the peel test it is in one embodiment desired that the bonding between the polymer layer and the film layer is so strong that the combined film/tape is not only separated along its interfacial layers, but that the material of at least one of the layers is torn up, or in other words that at least one of the layers has cohesion failure under the load applied during the peel test.

In one embodiment, the combined film/tape has a peel strength using ASTM D3330 of at least 300 N/m, such as at least 500 N/m, such as at least 700 N/m.

In one embodiment, where the film layer in itself is a layered material, e.g. of two, three or four individual polymer, metal or other layers, all interface bondings including bondings between layers of the film and bondings between the polymer layer and the film layer, are stronger than the internal bondings in one of the polymer layer and the film layer. The individual layers may e.g. be glued or pressed together, or the bonding may be obtained by subjecting the polymeric layer to heat to softening or even melting point. As another alternative the individual layers may be sprayed or brushed e.g. in the form of a solution or dispersion in a solvent, which solvent afterwards is allowed to evaporate.

In one embodiment, the interface bondings(s) between the one or more layers is/are stronger than the internal bonding of the polymer layer.

In one embodiment, the interfacial bonding between the polymer layer and the film layer is sufficiently strong to prevent creation of gas pockets between the layers when subjected to an increased carbon dioxides pressure on the film side of the pipe, the increased carbon dioxides partial pressure e.g. being 1 bar, 5 bars 10, bars or even 50 bars.

The bonding between the polymer layer and the film layer may e.g. be sufficiently strong to prevent creation of gas pockets between the layers when subjected to an increased pressure on the film side of the pipe, where the pressure is 5 bar, 10 bars 50, bars or even 100 bars or higher, and where the gas comprises at least 10% by vol. of methane, at least 10% by vol. of hydrogen sulphides, and at least 10% by vol. of carbon dioxides.

In one embodiment, it is desired that the film layer or at least the surface of the film that is facing the polymer layer comprises C atoms. Thereby an improved adhesion between the film layer and the polymer layer may be obtained, in particular if the polymer layer is subjected to a cross-linking step after being applied face to face with the film layer, because this cross-linking step may provide covalent bondings between the polymer layer and the C atoms of the film layer.

In one embodiment, the surface of the film facing the polymer layer comprises a primer. This primer may in principle be any type of primer that facilitates a satisfactory bonding between the polymer layer and the film layer. The primer may e.g. be a C atom containing primer.

Thus, in one embodiment the film or the film with a primer comprises C atoms, and the polymer is a cross-linked polymer with bondings linking to the C atoms of the film.

The optimal primer depends largely on the film layer material. Examples of useful primers include latex primers (UCAR™ Latex by DOW. Latex Metal Primer—DTM by Hytech), epoxy primers (EP420 PRIMER GREEN by AEROCENTER AIRCRAFT SUPPLY and AVIONICS), ascrylat/methacrylat primers, Rusty Metal Primer by Rustoleum, Metal-Prime by Hytech, Anti-rust primer by Plascon International Ltd, MPI #23 Surface Tolerant Metal Primer by Bennette paint.

The primer may for example be applied by spraying gluing and/or pressing. Alternatively the primer may be a plasma deposited layer.

The thickness of the polymer layer should preferably be in the interval of 4 to 25 mm. A too thin layer may have too low mechanical strength, whereas a too thick polymer layer may result in reduced flexibility of the final unbonded pipe. In general, it is thus desired that the polymer layer has a thickness of at least 4 mm, such as at least 6 mm, such as at least 8 mm, such as at least 10 mm, such as at least 12 mm, and preferably the polymer layer has a thickness between 4 and 20 mm, such as between 8 and 15 mm.

For maintaining high flexibility while having low gas permeability, it is desired that the polymer layer is thicker than the film layer, such as 4 times as thick or more, such as 10 times as thick or more such as 10 times as thick or more, such as 50 times as thick or more, such as up to 100 times as thick.

Desired thickness of the film layer is therefore in general less than 4 mm. The film layer may thus e.g. have a thickness of about 25 µm or more, such as about 100 µm or more, such as about 500 µm or more, such as about 1 mm or less.

In one embodiment, the film is in the form of a tape wound onto the pipe, where the term "tape" includes thin films of 1 mm or less and with a width of up to 10 cm.

As indicated above, it is desired that the major gas barrier is provided with the film layer. In one embodiment, the film layer is the innermost layer of said film layer and said polymer layer. Since the film layer has a low or no gas permeability to the gases methane, hydrogen sulphides, carbon dioxides, the polymer layer is protected from these gases and the requirements to the chemically stability of the polymer layer is low compared with prior art polymer inner liners.

By having a high barrier against the aggressive gases in the innermost layer which is thereby in direct contact with the fluid to be transported in the pipe, focus can be put on other properties when choosing the material for the polymer layer.

In an alternative embodiment, the polymer layer is the innermost layer which is thereby in direct contact with the fluid to be transported in the pipe. The film layer is thus partly protected from the aggressive fluids to be transported in the pipe. In this embodiment, in order to have an acceptable lifetime the polymer layer should preferably have a high chemically resistance.

The film layer preferably has a higher diffusion barrier to methane, hydrogen sulphides, carbon dioxides and water than the polymer layer.

In one embodiment, the film layer provides a fluid permeation barrier against one or more and preferably all of the fluids methane, hydrogen sulphides, carbon dioxides and water, which is higher, such as least 50% higher, such as least 100% higher, such as least 500% higher, such as least 1000% higher, than the fluid permeation barrier provided by the polymer layer determined at 50° C. and a pressure difference of 50 bar.

In one embodiment, the film layer is essentially impermeable to one or more of the fluids hydrogen sulphides, methane and carbon dioxide, at a partial pressure for the respective fluids on the first side of the layer of 0.03 bars or more, such as 0.1 bars or more, such as 1 bar or more, such as 10 bars or more measured at about 50° C. and a pressure difference of 50 bar.

In one embodiment, the film layer is essentially impermeable to H2O (preferably liquid or gas), and a pressure difference of 50 bar.

In one embodiment, the film layer is essentially impermeable to hydrogen sulphides at a partial pressure of 0.03 bars or more, such as 0.1 bars or more at a temperature of about 25° C., preferably at a temperature of about 50° C., preferably at a temperature of about 90° C., preferably at a temperature of up to about 150° C. and a pressure difference of 50 bar.

In one embodiment, the film layer is essentially impermeable to methane at a partial pressure of 1 bar or more, such as 10 bars or more at a temperature of about 25° C., preferably at a temperature of about 50° C., preferably at a temperature of about 90° C., preferably at a temperature of up to about 150° C. and a pressure difference of 50 bar.

In one embodiment, the film layer is essentially impermeable to carbon dioxide, at a partial pressure of 1 bar or more, such as 10 bars or more at a temperature of about 25° C., preferably at a temperature of about 50° C., preferably at a temperature of about 90° C., preferably at a temperature of up to about 150° C. and a pressure difference of 50 bar.

In one embodiment, the film layer is sandwiched between two polymer layers. It is in this embodiment desired that at least one of the polymer layers is bonded to the film layer with a bonding that is stronger than the internal cohesion of said polymer layer.

At least one of the polymer layers in the sandwich structure and preferably both, independently of each other, are of a polymer selected from the group as specified above.

In one sandwich structure embodiment, the innermost polymer layer of the two polymer layers is PVDF and the polymer layer on the in radial direction outermost of the two polymer layer is cross-linked polyethylene (XLPE). In another alternative embodiment, the innermost polymer layer of the two polymer layers is cross-linked polyethylene (XLPE).

The tape may e.g. be a wound or folded tape, e.g. wound or folded directly on a carcass or wound or folded onto an innermost polymer layer.

The flexible unbonded pipe may e.g. comprise one or more innermost unbonded armouring layers normally referred to as a carcass. Such carcass is preferably a metallic carcass and is normally fluid pervious. In one embodiment, the carcass is of wound interlocked profiles.

The flexible unbonded pipe of the invention comprises an inner liner which forms a barrier against the outflow of the fluid which is conveyed through the pipe, and one or more armouring layers on the outer side of the inner liner (Outer armouring layer(s)). The flexible pipe may comprise additional layers such as one or more inner armour layers to prevent the collapse of the inner liner. Such inner armouring layer or layers are normally referred to as a carcass. An outer sheath may be provided with the object of forming a barrier against the ingress of fluids from the pipe surroundings to the armour layers cover layer and one or more intermediate layers. At least one of said inner liners, intermediate layers and outer sheath is in the form of a combined polymer/film layer as described above.

The armour layers on the outer side of the inner liner may e.g. be of a composite material e.g. as disclosed in WO 02095281. Alternatively the armour layers may be of metal profiles helically wound e.g. as disclosed in WO 0036324 and WO0181809.

In one embodiment, the flexible tubular pipe of the invention comprises at least one inner liner in the form of a combined polymer/film layer as described above and at least one armouring layer which is not bonded to the combined polymer/film layer.

In one embodiment, the pipe is of the type comprising at least, from the interior towards the exterior, an internal non-impervious metal carcass, an inner liner, a set of layers of reinforcement wires, and an external protection sheath, at least one of said inner liners, intermediate layers and outer sheath being in the form of a combined polymer/film layer as described above.

The one or more outer armouring layers may preferably be in the form of helically wound steel wires e.g. shaped as profiles, where the individual layers may be wound at different winding angle relative to the pipe axis.

In one embodiment, the flexible pipe comprises, from the inside to the outside, a body consisting of an interlocked steel tape, an inner liner in the form of a combined polymer/film layer as described above, at least one pressure armouring consisting of interlocked wires spirally wound with a small pitch (e.g. a winding at an angle in relation to the axis of the pipe of about 85°), at least one layer of traction armour wires spirally wound with a long pitch (e.g. a winding at an angle in relation to the axis of the pipe of about 35°). This configuration is referred to as rough bore.

In another embodiment, the flexible pipe comprises an inner liner in the form of a combined polymer/film layer as described above, a first armouring mainly withstanding the pressure generated by the fluid in the internal sheath, generally referred to as pressure layer, possibly a second armour essentially withstanding the traction produced notably by the pressure of the fluid. This variant is referred to as smooth bore.

In a further embodiment, the flexible pipe comprises an inner liner in the form of a combined polymer/film layer as described above, an armouring (outer armouring) placed above the inner liner, both withstanding longitudinal tensile stresses and the circumferential component due to the inside pressure of the fluid. Such a pressure armouring can comprise two layers of reverse-pitch spiral wires whose armouring angles are close to 55° in relation to the axis of the pipe. The stresses due to the inside pressure are in this case taken up by these layers.

The invention also relates to a method of producing a flexible unbonded pipe comprising the steps of providing at least one polymer layer and at least one film layer and bonding said layers to each other.

The layers polymer layer and film layer may be bonded as disclosed above.

The method according to the invention preferably comprises the steps of
  providing an innermost polymer layer, preferably around a mandrel or an inner armour layer (carcass), more preferably by extrusion, winding or wrapping,
  providing a film layer around said innermost polymer layer, preferably by extrusion, winding or wrapping,
  providing a second polymer layer around said film layer, preferably by extrusion, and
  providing a bonding between at least one of said polymer layers and said film layer, said bonding preferably being provided by subjecting said at least one polymer layer to cross-linking.

In this method a sandwich structure as disclosed above is produced.

In a variation thereof, the method according to the invention comprises the steps of
  providing a film layer around a mandrel or an inner armour layer (carcass), preferably by extrusion, winding or wrapping,
  providing a polymer layer around said film layer, preferably by extrusion, and
  providing a bonding between said polymer layers and the film, said bonding preferably being provided by cross-linking of the polymer layer.

In yet another variation thereof, the method according to the invention comprises the steps of
  providing the innermost layered section of the flexible pipe comprising at least an innermost polymer layer and an armour layer on the outer side of said innermost polymer layer,
  providing a film layer around said innermost layered section of the flexible pipe, preferably by extrusion, winding or wrapping,
  providing an outer polymer layer around said film layer, preferably by extrusion, and
  providing a bonding between at least one of said polymer layers and the film, said bonding preferably being provided by subjecting said polymer layer to cross-linking.

The film may be as disclosed above. In one embodiment, it is desired that the film e.g. the metallic film is treated by corona or by application of a primer for increasing bonding, said primer preferably being applied using CVD, spraying, dipping and/or rolling. Thereby an improved adhesion between the polymer layer and the film layer can be obtained.

For additional adhesion it is desired that the film or a primer coated onto said film comprises C atoms, thereby covalent bondings can be provided when subjecting the polymer layer to cross-linking.

The primer may be as disclosed above.

The polymer layer to be cross-linked may preferably be as in the co pending application PCT/DK 03/00191, and may therefore preferably be subjected to cross-linking using IR radiation.

In one embodiment, it is thus desired that at least one polymer layer is cross-linked after being applied in contact with the film, which film preferably comprises C-atoms.

EXAMPLES

Example 1

A self-interlocking carcass of 6" inner diameter (15.2 cm) is produced. The outer diameter of this steel carcass is approximately 16.7 cm. Onto the carcass a tape consisting of a 0.1 mm thick steel coated with an acrylat/methacrylat primer is wound. The tape has a width of 5 cm and is wound with an overlap of about 4 mm.

Onto the tape a polymer layer in the form of a polyethylene is extruded. The carcass with tape is fed into the centre of a crosshead tool. In this tool, the polyethylene melt is distributed in a pipe type tool and upon the exit of the crosshead is drawn onto the carcass with tape in approx. 6 mm thickness at a line speed of 0.48 to 0.55 meters/minute.

The extruder is a conventional polyethylene single screw extruder with a 120 mm screw diameter and an L/D ratio of 30, with a standard screw. The extrusion process is found not to be temperature sensitive. The temperature setting on the heating zones of the extruder and head ranges from 150 to 165° C., and melt temperature is typically 160° C.

The polyethylene is a mixture of 90% HD-PE, grade 5621 from Basell and 10% UHW-PE powder, grade HE 2591 from Borealis. The additives are a mixture of 0.45% DYBP from Degussa and 0.40% Irganox XP621 from Ciba. DYBP (2,5-dimethyl hexine-3 2,5-di-t-butyl peroxide) is the peroxide which induces cross-linking of the PE. DYBP is activated by infrared radiation (DYBP may also be activated by heat at 180° C., thus the temperature in the extruder should not at any time exceed 175° C.). Irganox is an antioxidant. The material is fed into the extruder as a premix.

After the extrusion the pipe passes through an IR oven with a capacity of 75 kW. Residence-time in the oven is 30-60 seconds.

After this the carcass with inner liner is cooled with water and led through a caterpillar.

Thereafter a pressure armouring consisting of interlocked wires was spirally wound with a small pitch and a traction armour wire spirally wound with a long pitch, and finally the pipe was coated with an outer sheet provided by extrusion.

Example 2

A pipe is produced as in example 1 with the difference that a film as disclosed in example 1 is provided onto the traction armour wires and that the outer sheath is a 6 mm polyethylene as disclosed in example 1 and that the polyethylene of the outer sheath is subjected to an irradiation after the extrusion thereof.

Example 3

A pipe is produced as in example 1 with the difference that a polymer layer of PVDF is applied by extrusion directly onto the carcass and that the film is wound onto the PVDF layer.

The invention claimed is:

1. A flexible unbonded pipe, said pipe comprising at least one polymer layer having a thickness of 4 mm or more, least one film layer having a thickness of greater than 0 mm and 1 mm or less, and one or more armouring layers, said polymer layer being at least 10 times as thick as the film, said film layer providing a fluid permeation barrier against one or more of the fluids methane, hydrogen sulphides, carbon dioxides and water, which is higher than the fluid permeation barrier provided by the polymer layer determined at 50° C. and a pressure difference of 50 bar, and said polymer layer being bonded to said film layer via one or more bondings selected from the group of chemical bondings and physical bondings,
wherein said armouring layers are not bonded to said polymer layer, and said armouring layers are not bonded to each other, and
wherein said film layer and said polymer layer are of different materials.

2. A flexible pipe according to claim 1 wherein the polymer layer comprises one or more of the polymers selected from the group consisting of polyolefins; polyamide; polyimide (PI); polyurethanes; polyureas; polyesters; polyacetals; polyethers; polyoxides; polysulfides; polysulphones; polyacrylates; polyethylene terephthalate (PET); polyether-ether-ketones (PEEK); polyvinyls; polyacrylonitrils; polyetherketoneketone (PEKK); copolymers of the preceding and fluorous polymers.

3. A flexible pipe according to claim 2 wherein the polymer layer comprises cross-linked polyethylene (XLPE).

4. A flexible pipe according to claim 1 wherein the film layer is of a material selected from the group consisting of polymer, metal, metal containing compositions and combinations thereof.

5. A flexible pipe according to claim 4 wherein the film layer is a polymer film comprising one or more of the polymer material selected from the group consisting of polyolefins; polyamide; polyimide (PI); polyurethanes; polyureas; polyesters; polyacetals; polyethers; polyoxides; polysulfides; polysulphones; polyacrylates; polyethylene terephthalate (PET); polyether-ether-ketones (PEEK); polyvinyls; polyacrylonitrils; polyetherketoneketone (PEKK); copolymers of the preceding and fluorous polymers.

6. A flexible pipe according to claim 4 wherein the film layer is a metal film selected from the group consisting of aluminum, stainless steel and duplex.

7. A flexible offshore pipe according to claim 4 wherein the film layer is a layered material comprising at least one metal layer.

8. A flexible pipe according to claim wherein the film layer comprises metal-containing compositions.

9. A flexible pipe according to claim 4 wherein the film layer comprises a mixture of polymer with particles selected from the group consisting of carbon particles, metal particles, metal-containing particles, and mixtures thereof.

10. A flexible pipe according to claim 1 wherein the polymer layer is bonded to the film layer via one or more bondings comprising at least one of the chemical bondings selected from the group of ion bondings and covalent bondings.

11. A flexible pipe according to claim 1 wherein the bonding between the polymer layer and the film layer is stronger than the internal bondings in one of the polymer layer and the film layer.

12. A flexible pipe according to claim 11 wherein the film layer is a layered material, and all interface bondings including bondings between layers of the film and bonding between the polymer layer and the film layer, are stronger than the internal bondings in one of the polymer layer and the film layer.

13. A flexible pipe according to claim 11 wherein, the interface bonding(s) is/are stronger than the internal bonding of the polymer layer.

14. A flexible pipe according to claim 1 wherein the interfacial bonding between the polymer layer and the film layer is sufficiently strong to prevent creation of gas pockets between the layers when subjected to an increased carbon dioxides pressure on the film side of the pipe.

15. A flexible pipe according to claim 1 wherein the bonding between the polymer layer and the film layer has a peel strength using ASTM D3330 of at least 300 N/m.

16. A flexible pipe according to claim 1 wherein the bonding between the polymer layer and the film layer is stronger than the cohesive forces in one of the polymer layer and the film layer measured by 90° peel test.

17. A flexible pipe according to claim 1 wherein the surface of the film facing the polymer layer comprises a primer.

18. A flexible pipe according to claim 1 wherein the polymer layer has a thickness between 4 and 20 mm.

19. A flexible pipe according to claim 1 wherein the film layer has a thickness of about 25 μm or more and 1 mm or less.

20. A flexible pipe according to claim 1 wherein the film layer provides a fluid permeation barrier against at least one of the fluids selected from methane, hydrogen sulphides, carbon dioxides and water, which is at least 50% higher than the fluid permeation barrier provided by the polymer layer determined at 50° C. and a pressure difference of 50 bar.

21. A flexible pipe according to claim 1 wherein the film layer provides a fluid permeation barrier against all of the fluids methane, hydrogen sulphides, carbon dioxides and water, which is higher than the fluid permeation barrier provided by the polymer layer determined at 50° C. and a pressure difference of 50 bar.

22. A flexible pipe according to claim 20 wherein the film layer is essentially impermeable to at least one of the fluids selected from hydrogen sulfides, methane, and carbon dioxide, at a partial pressure for the respective fluid on a first side of the layer of at least 0.03 bars measured at about 50° C. and a pressure difference of 50 bar.

23. A flexible pipe according to claim 20 wherein the film layer is essentially impermeable to $H_2O$, measured at about 50° C. and a pressure difference of 50 bar.

24. A flexible pipe according to claim 20 wherein the film layer is essentially impermeable to hydrogen sulfides at a partial pressure of at least 0.03 bars at a temperature of about 25° C. and a pressure difference of 50 bar.

25. A flexible pipe according to claim 20 wherein the film layer is essentially impermeable to methane at a partial pressure of at least 1 bar at a temperature of about 25° C. and a pressure difference of 50 bar.

26. A flexible pipe according to claim 20 wherein the film layer is essentially impermeable to carbon dioxide, at a partial pressure of at least 1 bar at a temperature of about 25° C. and a pressure difference of 50 bar.

27. A flexible pipe according to claim 1 wherein said film layer is the innermost layer of said film layer and said polymer layer.

28. A flexible pipe according to claim 1 wherein said film layer is sandwiched between two polymer layers, at least one of the polymer layers being bonded to the film layer, with a bonding that is stronger than the internal cohesion of said polymer layer.

29. A flexible pipe according to claim 1 wherein said film layer is sandwiched between two polymer layers, and the innermost polymer layer of the two polymer layers is selected from the group consisting of polyolefins; polyamide; polyimide (PI); polyurethanes; polyureas; polyesters; polyacetals; polyethers; polyoxides; polysulfides; polysulphones; polyacrylates; polyethylene terephthalate (PET); polyether-etherketones (PEEK); polyvinyls; polyacrylonitrils; polyetherketoneketone (PEKK); copolymers of the preceding and fluorous polymers.

30. A flexible pipe according to claim 29 wherein the innermost polymer layer of the two polymer layers being PVDF (poly(vinylidene fluoride)) and the polymer layer on the in radial direction outermost of the two polymer layer is cross-linked polyethylene (XLPE).

31. A flexible pipe according to claim 29 wherein the innermost polymer layer of the two polymer layers is cross-linked polyethylene (XLPE).

32. A flexible pipe according to claim 1 wherein the film layer is in the form of a tape wound around an innermost polymer layer.

33. A flexible pipe according to claim 1 wherein the film layer is in the form of a tape folded around an innermost polymer layer.

34. A flexible pipe according to claim 1 wherein said film layer comprises C atoms, the polymer being a cross-linked polymer with bondings linking to the C atoms of the film layer.

35. A flexible pipe according to claim 1 wherein said pipe comprises one or more innermost unbonded armouring layers (carcass).

36. A flexible pipe according to claim 1 wherein at least one of said armouring layers is on the outer side of the polymer layer bonded to said film layer.

* * * * *

UNITED STATES PATENT AND TRADEMARK OFFICE
CERTIFICATE OF CORRECTION

| | | |
|---|---|---|
| PATENT NO. | : 7,976,920 B2 | |
| APPLICATION NO. | : 10/572190 | |
| DATED | : July 12, 2011 | |
| INVENTOR(S) | : Poul Erik Braad et al. | |

It is certified that error appears in the above-identified patent and that said Letters Patent is hereby corrected as shown below:

In the Claims, column 10, line 51, add -- 4 -- between "claim" and "wherein"

Signed and Sealed this
Twentieth Day of September, 2011

David J. Kappos
*Director of the United States Patent and Trademark Office*